US011639430B2

(12) United States Patent
Yang et al.

(10) Patent No.: US 11,639,430 B2
(45) Date of Patent: May 2, 2023

(54) BLACK POLYESTER FILM AND METHOD FOR MANUFACTURING THE SAME

(71) Applicant: NAN YA PLASTICS CORPORATION, Taipei (TW)

(72) Inventors: Wen-Cheng Yang, Taipei (TW); Te-Chao Liao, Taipei (TW); Chun-Cheng Yang, Taipei (TW); Chia-Yen Hsiao, Taipei (TW); Ching-Yao Yuan, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 36 days.

(21) Appl. No.: 17/400,146

(22) Filed: Aug. 12, 2021

(65) Prior Publication Data

US 2022/0243029 A1 Aug. 4, 2022

(30) Foreign Application Priority Data

Jan. 29, 2021 (TW) .................................. 110103380

(51) Int. Cl.
| | |
|---|---|
| *B29C 48/08* | (2019.01) |
| *C08J 11/10* | (2006.01) |
| *B29C 48/00* | (2019.01) |
| *C08J 5/18* | (2006.01) |
| *C08J 11/06* | (2006.01) |
| *C08L 67/02* | (2006.01) |
| *B29K 67/00* | (2006.01) |
| *B29K 105/26* | (2006.01) |
| *B29L 7/00* | (2006.01) |

(52) U.S. Cl.
CPC ............ *C08J 11/10* (2013.01); *B29C 48/022* (2019.02); *B29C 48/08* (2019.02); *C08J 5/18* (2013.01); *C08J 11/06* (2013.01); *C08L 67/02* (2013.01); *B29K 2067/00* (2013.01); *B29K 2105/26* (2013.01); *B29L 2007/008* (2013.01); *C08J 2367/02* (2013.01); *C08L 2205/025* (2013.01); *C08L 2207/20* (2013.01)

(58) Field of Classification Search
USPC ......................................................... 521/48
See application file for complete search history.

(56) References Cited

U.S. PATENT DOCUMENTS 4,603,073 A * 7/1986 Renalls .............. G11B 5/73931
428/323

FOREIGN PATENT DOCUMENTS

| | | |
|---|---|---|
| CN | 1806000 | 7/2006 |
| CN | 111138641 | 5/2020 |
| EP | 3778743 | 2/2021 |
| JP | 63101432 | * 5/1988 |
| JP | 2011-256328 | * 12/2011 |
| JP | 2011256328 | 12/2011 |
| JP | 2014185243 | 10/2014 |
| JP | 2015028962 | 2/2015 |
| JP | 2021031668 | 3/2021 |
| WO | 2015016111 | 2/2015 |

OTHER PUBLICATIONS

JP 63101432 Kato et al. machine translation (Year: 1988).*
JP2011-256328, Koji, machine translation Dec. 22, 2011 (Year: 2011).*
Firas Awaja et al., "Recycling of PET", European Polymer Journal, vol. 41, Issue 7, Jul. 1, 2005, pp. 1453-1477.
"Search Report of Europe Counterpart Application", dated Feb. 23, 2022, p. 1-p. 11.
"Office Action of Taiwan Counterpart Application", dated Mar. 14, 2022, p. 1-p. 6.
"Office Action of Japan Counterpart Application", dated Sep. 13, 2022, p. 1-p. 3.

\* cited by examiner

*Primary Examiner* — Terressa Boykin
(74) *Attorney, Agent, or Firm* — JCIPRNET

(57) ABSTRACT

A black polyester film and a method for manufacturing the same are provided. The method for manufacturing the black polyester film includes: providing a recycled polyester material; physically regenerating a part of the recycled polyester material to form physically regenerated polyester chips having a first intrinsic viscosity; chemically regenerating another part of the recycled polyester material to form chemically regenerated polyester chips having a second intrinsic viscosity lower than the first intrinsic viscosity; mixing black regenerated polyester chips, the physically regenerated polyester chips, and the chemically regenerated polyester chips according to a predetermined intrinsic viscosity so as to form a polyester chip raw material; melting and then extruding the polyester chips raw material to form the black polyester film having the predetermined intrinsic viscosity.

8 Claims, 4 Drawing Sheets

BLACK POLYESTER FILM AND METHOD FOR MANUFACTURING THE SAME

CROSS-REFERENCE TO RELATED APPLICATION

This application claims the priority benefit of Taiwan application serial no. 110103380, filed on Jan. 29, 2021. The entirety of the above-mentioned patent application is hereby incorporated by reference herein and made a part of this specification.

BACKGROUND

Technical Field

The disclosure relates to a black polyester film and a method for manufacturing the same, particularly to a black polyester film made from a physically regenerated polyester resin and a chemically regenerated polyester resin, and a method for manufacturing the same.

Related Art

The most common conventional methods for recycling waste polyethylene terephthalate (PET) bottles include a physical recycling method (also called a mechanical recycling method). The physical recycling method mainly includes the following. Firstly, PET bottle waste is physically and mechanically crushed. Next, the crushed PET bottle waste is placed in a high temperature environment for melting. Next, the molten PET bottle waste is subjected to granulation to form physically regenerated polyester chips. These physically regenerated polyester chips may be used in subsequent processing operations.

The physically regenerated polyester chips produced by the physical recycling method usually have a relatively high intrinsic viscosity (IV). To adjust the intrinsic viscosity of the physically regenerated polyester chips, a method mainly used in the related art is solid state polymerization. However, the solid state polymerization method may only be used to increase the intrinsic viscosity of the physically regenerated polyester chips, and may not be used to reduce the intrinsic viscosity of the physically regenerated polyester chips. In addition, in a general film making process, the intrinsic viscosity of polyester chips is usually limited within a certain range. The physically regenerated polyester chips produced by the physical recycling method are usually only applicable to a bottle blowing process and a spinning process, and are not applicable to a film extrusion process.

In order to adapt the physically regenerated polyester chips for use in a film making process, a method mainly used in the related art is to reduce the overall intrinsic viscosity of the polyester material by mixing the physically regenerated polyester chips with additional virgin polyester chips. However, such a method is unable to effectively increase the proportion of a recycled polyester material used in a black polyester film, and thus, a final black polyester film product may not meet the demand for environmental protection. That is, in the existing black polyester films, the proportion of recycled polyester is limited to a certain extent, and this issue needs to be addressed.

SUMMARY

The disclosure provides a black polyester film and a method for manufacturing the same.

An embodiment provides a method for manufacturing a black polyester film. The method includes the following steps. A recycled polyester material is provided. Physically regenerated polyester chips are formed by physically regenerating a part of the recycled polyester material. The physically regenerated polyester chips have a first intrinsic viscosity. Chemically regenerated polyester chips are formed by chemically regenerating another part of the recycled polyester material. The chemically regenerated polyester chips have a second intrinsic viscosity, and the second intrinsic viscosity is lower than the first intrinsic viscosity. Black regenerated polyester chips, the physically regenerated polyester chips, and the chemically regenerated polyester chips are mixed to form a polyester chip raw material according to a predetermined intrinsic viscosity. The polyester chip raw material is melted and then extruded, thereby forming a black polyester film. The black polyester film has the predetermined intrinsic viscosity. The black polyester film has an intrinsic viscosity of 0.4 dL/g to 0.8 dL/g, an acid value of 10 mgKOH/g to 80 mgKOH/g, a surface roughness (Ra) of 1 nanometer (nm) to 300 nm, and a kinetic friction coefficient of 0.2 to 0.4.

An embodiment provides a black polyester film. The black polyester film is formed by mixing, melting and extruding a physically regenerated polyester resin and a chemically regenerated polyester resin according to a predetermined intrinsic viscosity, so that the black polyester film has the predetermined intrinsic viscosity. The predetermined intrinsic viscosity of the black polyester film is 0.40 dL/g to 0.80 dL/g. The black polyester film has an acid value of 10 mgKOH/g to 80 mgKOH/g, a surface roughness of 1 nm to 300 nm, and a kinetic friction coefficient of 0.2 to 0.4.

In some embodiments, a content of isophthalic acid in the black polyester film is 0.1 mol % to 7 mol % based on a total amount of 100 mol % of the black polyester film. A storage modulus of the black polyester film measured at 150° C. and 10 Hz is $1.5 \times 10^9$ dyne/cm$^2$ to $4.0 \times 10^9$ dyne/cm$^2$.

In some embodiments, the black polyester film has a haze of more than 80%, a light transmittance of less than 10%, and an optical density of more than or equal to 1.2.

In some embodiments, a content of biomass-derived ethylene glycol in the black polyester film is not more than 5 wt % based on a total amount of 100 wt % of the black polyester film.

An embodiment provides a black polyester film. The black polyester film has a predetermined intrinsic viscosity of 0.40 dL/g to 0.80 dL/g, an acid value of 10 mgKOH/g to 80 mgKOH/g, a surface roughness of 1 nm to 300 nm, and a kinetic friction coefficient of 0.2 to 0.4.

In some embodiments, a content of isophthalic acid in the black polyester film is 0.1 mol % to 7 mol % based on a total amount of 100 mol % of the black polyester film. A storage modulus of the black polyester film at 150° C. and 10 Hz is $1.5 \times 10^9$ dyne/cm$^2$ to $4.0 \times 10^9$ dyne/cm$^2$.

In some embodiments, the black polyester film has a haze of more than 80%, a light transmittance of less than 10%, and an optical density of more than or equal to 1.2.

In some embodiments, a content of biomass-derived ethylene glycol in the black polyester film is not more than 5 wt % based on a total amount of 100 wt % of the black polyester film.

The features and technical content of the disclosure will become apparent from the detailed description and drawings below. However, the drawings provided are only for illustration purposes and are not limiting.

DESCRIPTION OF THE EMBODIMENTS

Implementations of the "black polyester film and method for manufacturing the same" of the disclosure are described below by way of specific embodiments. The disclosure will become apparent to those skilled in the art from the content disclosed in this specification. The disclosure may be implemented or applied through other different specific embodiments. The details of this specification may be modified or changed in various ways without departing from the spirit of the disclosure base on different perspectives and applications. In addition, it is to be noted that the drawings of the disclosure are schematic illustrations and are not drawn according to actual dimensions. The following description will further detail the technical content of the disclosure. However, the content disclosed herein is not intended to limit the protection scope of the disclosure. In addition, the term "or" as mentioned herein may include any and all combinations of one or more of the associated listed items, depending on the actual situation.

[Method for Manufacturing Black Polyester Film]

The disclosure increases the proportion of a recycled polyester material used in a black polyester film, thereby enabling a black polyester film product to meet the demand for environmental protection.

Figure 1:
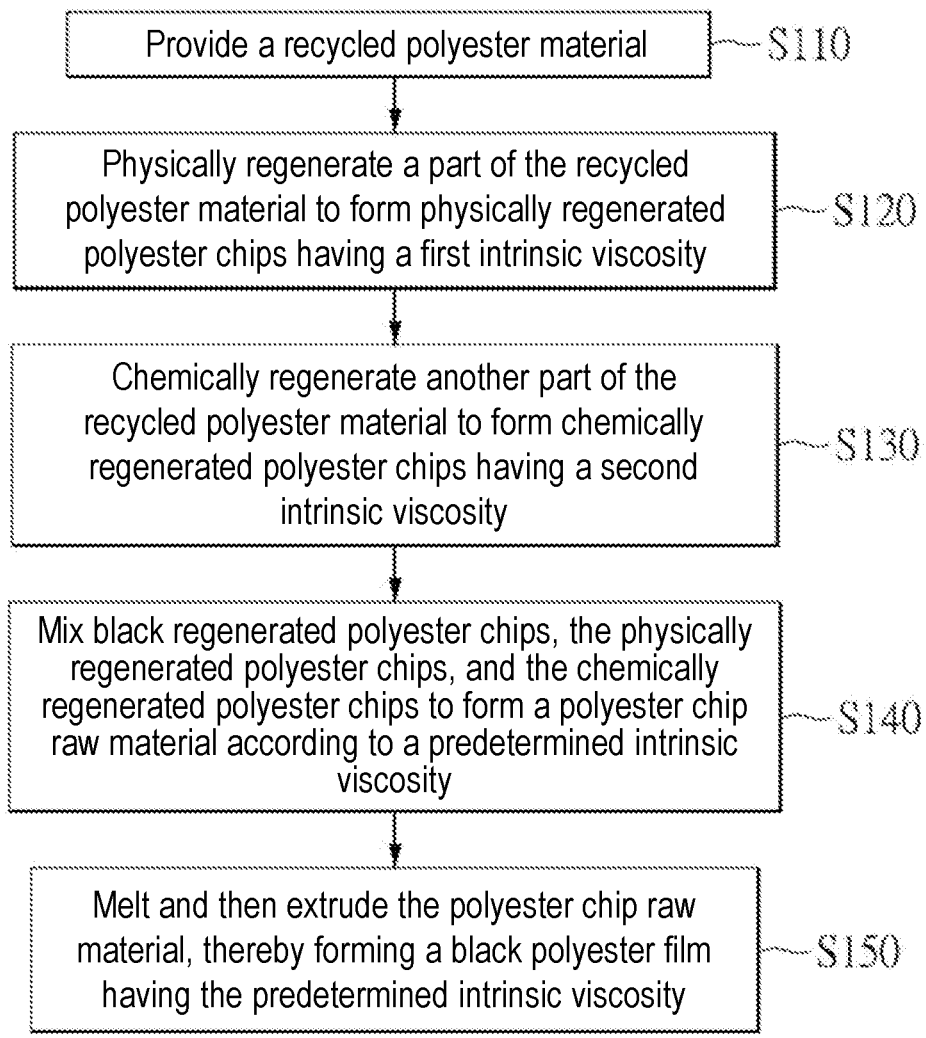
FIG. 1 is a schematic flowchart of a method for manufacturing a black polyester film according to an embodiment of the disclosure.

Referring to FIG. 1, according to an embodiment of the disclosure, a method for manufacturing a black polyester film is provided, by which the proportion of a recycled polyester material used in a black polyester film may be effectively increased and a black polyester film thus produced has a good processability. The method for manufacturing a black polyester film includes step S110 to step S150. It is to be noted that the order of the steps described in the present embodiment and the actual operation method may be adjusted according to needs and are not limited to those described in the present embodiment.

Step S110 includes providing a recycled polyester material.

In order to form a reusable recycled polyester material, a method for recycling a polyester material includes: collecting various types of polyester wastes; and classifying the polyester wastes according to their type, color, and use. Next, the polyester wastes are compressed for being packed. Next, the packed polyester wastes are transported to a waste treatment plant. In the present embodiment, the polyester wastes are recycled PET bottles (r-PET). However, the disclosure is not limited thereto.

The method for recycling a polyester material further includes: removing other objects (for example, bottle caps, labels, and adhesives) on the polyester wastes. Next, the polyester wastes are physically and mechanically crushed. Next, the bottle caps, liners, and bottle bodies of different materials are separated by flotation. Next, the crushed polyester wastes are dried to form a processed recycled polyester material such as recycled PET bottle flakes, thereby facilitating a subsequent film production process.

It is worth mentioning that, in other modified embodiments of the disclosure, the recycled polyester material may be, for example, a processed recycled polyester material obtained by direct purchase.

It is to be noted that the terms "polyester" and "polyester material" as mentioned herein refer to any type of polyester, particularly an aromatic polyester, and here particularly refer to a polyester derived from terephthalic acid and ethylene glycol, that is, polyethylene terephthalate (PET).

Furthermore, the polyester may also be, for example, polytrimethylene terephthalate (PTT), polybutylene terephthalate (PBT), or polyethylene naphthalate (PET). In the present embodiment, the polyester is preferably PET and/or PTT. In addition, a copolymer may also be used. The copolymer particularly refers to a copolymer that may be obtained from two or more dicarboxylic acids and/or two or more glycol components.

In an embodiment of the disclosure, the recycled PET bottle flakes comprise isophthalic acid (IPA) as a diacid unit. Therefore, the final formed black polyester film also comprises the IPA. Based on a total amount of 100 mol % of the black polyester film, a content of the IPA in the black polyester film is 0.1 mol % to 7 mol %, and is preferably 0.5 mol % to 5 mol %.

In an embodiment of the disclosure, the recycled PET bottle flakes comprise biomass-derived ethylene glycol as a diol unit. Therefore, the final formed black polyester film also comprises the biomass-derived ethylene glycol. Based on a total amount of 100 wt % of the black polyester film, a content of the biomass-derived ethylene glycol in the black polyester film is not more than 5 wt %. In addition, based on all carbons in the black polyester film, a content of biomass-derived carbon measured by radioactive element ($C^{14}$) is not more than 5%.

In an embodiment of the disclosure, the recycled PET bottle flakes comprise a metal catalyst. Therefore, the final formed black polyester film also comprises the metal catalyst. The metal catalyst is at least one material selected from a group of consisting of antimony (Sb), germanium (Ge), and titanium (Ti). Based on a total amount of 100 wt % of the black polyester film, a content of the metal catalyst in the black polyester film is 0.0003 wt % to 0.04 wt %.

Step S120 includes: physically regenerating a part of the recycled polyester material to form physically regenerated polyester chips. The physically regenerated polyester chips have a first intrinsic viscosity. In the present embodiment, the first intrinsic viscosity of the physically regenerated polyester chips is usually not less than 0.60 dL/g, and is preferably 0.65 dL/g to 0.90 dL/g, particularly preferably 0.65 dL/g to 0.80 dL/g.

Specifically, the manufacturing step of the physically regenerated polyester chips includes: physically and mechanically crushing one part of the recycled polyester material (for example, r-PET bottle flakes), so as to reduce time and energy consumption required for melting the recycled polyester material. Next, the crushed recycled polyester material is subjected to melting by single-screw extruder twin-screw extruder so that the recycled polyester material is in a molten state. Next, the recycled polyester material in the molten state is filtered by a first sieve to remove solid impurities from the recycled polyester material, thereby granulating to form the physically regenerated polyester chips.

That is, the recycled polyester material is reshaped by cutting, melting, filtration, and extrusion in sequence. Thus, polyester molecules in the original recycled polyester material are rearranged, and multiple physically regenerated polyester chips are produced.

It is worth mentioning that, during the physical reproduction, the polyester molecules of the recycled polyester material are only rearranged, not reorganized. Therefore, components (for example, a metal catalyst, a slipping agent, or a copolymerized monomer) originally present in the original recycled polyester material are still present in the physically regenerated polyester material, and thus, the final formed black polyester film also includes the above components. Furthermore, the characteristics of the recycled polyester material itself are also retained in the physically regenerated polyester chips.

Since the recycled polyester material does not change much in molecular weight during the physical reproduction, the recycled polyester material in the molten state has relatively high viscosity and relatively poor flow properties. Accordingly, when a sieve having a too small mesh size is used, filtration efficiency is likely to be reduced.

In order to improve filtration, in the present embodiment, the first sieve preferably has a mesh size of 10 micrometer (μm) to 100 μm. That is, the first sieve is capable of filtering out solid impurities having a particle size larger than the above mesh size. However, the disclosure is not limited thereto.

It is worth mentioning that, for different film making processes, there will be different applicable intrinsic viscosity ranges. In generally, the physically regenerated polyester chips (physically regenerated polyester resin) obtained by the physical reproduction have a larger intrinsic viscosity (not less than 0.60 dL/g). If only the physically regenerated polyester chips (physically regenerated polyester resin) are used, the polyester chip raw material is only applicable to a bottle blowing process and a spinning process, and are not applicable to a film extrusion process.

To adjust the intrinsic viscosity of the physically regenerated polyester chips, a method mainly used in the related art is solid state polymerization. However, the solid state polymerization method may only be used to increase the intrinsic viscosity of the physically regenerated polyester chips, and may not be used to reduce the intrinsic viscosity of the physically regenerated polyester chips.

In an embodiment of the disclosure, the chemically regenerated polyester chips (chemically regenerated polyester resin) obtained by a chemical reproduction step in step S130 of the disclosure have a relatively low intrinsic viscosity (not more than 0.65 dL/g). Therefore, by using both the physically regenerated polyester chips and the chemically regenerated polyester chips and adjusting the proportion of the physically regenerated polyester chips and the chemically regenerated polyester chips, an effect of adjusting the intrinsic viscosity of the polyester chip raw material may be attained so that the polyester chip raw material may be applied in a film extrusion process.

Step S130 includes: chemically regenerating another part of the recycled polyester material to form chemically regenerated polyester chips. The chemically regenerated polyester chips have a second intrinsic viscosity, and the second intrinsic viscosity of the chemically regenerated polyester chips is lower than the first intrinsic viscosity of the physically regenerated polyester chips. In the present embodiment, the second intrinsic viscosity of the chemically regenerated polyester chips is usually not more than 0.65 dL/g, and is preferably 0.40 dL/g to 0.65 dL/g, particularly preferably 0.50 dL/g to 0.65 dL/g.

Specifically, the manufacturing step of the chemically regenerated polyester chips includes: cutting or crushing another part of the recycled polyester material (for example, r-PET bottle flakes), so as to reduce time and energy consumption required for depolymerizing the recycled polyester material. Next, the cut or crushed recycled polyester material is put into a chemical depolymerization solution to depolymerize the recycled polyester material, thereby forming a raw material mixture. Next, the raw material mixture is filtered by a second sieve to remove solid impurities from the recycled polyester material, thereby reducing the concentration of non-polyester impurities in the raw material mixture.

Next, the raw material mixture after filtration by the second sieve is subjected to an esterification reaction, and an inorganic additive or a copolymerizable compound monomer is added during the esterification reaction. Finally, under specific reaction conditions, monomers and/or oligomers in the raw material mixture are repolymerized and subjected to granulation, so as to form the chemically regenerated polyester chips. A liquid temperature of the chemical depolymerization solution may be, for example, 160° C. to 250° C. However, the disclosure is not limited thereto. Furthermore, a mesh size of the second sieve is smaller than the mesh size of the first sieve.

It is worth mentioning that the above chemical depolymerization solution may cause chain scission of polyester molecules in the recycled polyester material, thereby achieving the effect of depolymerization. Further, a polyester composition having a relatively short molecular chain and an ester monomer (for example, bis(2-hydroxyethyl) terephthalate (BHET)) composed of one diacid unit and two diol units may be obtained. That is, the raw material mixture has a smaller molecular weight than the recycled polyester material.

In the present embodiment, the chemical depolymerization solution may be, for example, a solution of water, methanol, ethanol, ethylene glycol, diethylene glycol or a combination thereof. However, the disclosure is not limited thereto. For example, water is used for hydrolysis, and methanol, ethanol, ethylene glycol, or diethylene glycol is used for alcoholysis.

In addition, it is worth mentioning that, unlike the physical reproduction operation, the chemical reproduction operation involves "depolymerization and repolymerization of the polyester molecules in the recycled polyester material" in which the polyester molecules may be depolymerized into molecules having a relatively small molecular weight and then repolymerized into a new polyester resin.

In other embodiments of the disclosure, the chemically regenerated polyester chips may be prepared not only by the method described in the above embodiments, but also by a hydrolysis method or a supercritical fluid method. The hydrolysis method is performed on the recycled polyester material in an alkaline solution, in which the temperature and pressure are controlled to a certain extent and microwave radiation is applied to completely decompose the polyester molecules into monomers. The supercritical fluid method is to decompose the recycled polyester material into a small amount of monomers and oligomers in methanol in a supercritical fluid state. The yield of the monomers and oligomers is affected by reaction temperature and reaction time.

Specifically, since the chemical recycling method is capable of depolymerizing the recycled polyester material into monomers having a small molecular weight, impurities (for example, colloidal impurities or other non-polyester impurities) originally present in the recycled polyester material (for example, r-PET bottle flakes) may be filtered out more easily than in the physical recycling method.

Furthermore, since the chemical reproduction operation is capable of reducing the molecular weight of the recycled polyester material (for example, by forming a polyester composition having a relatively short molecular chain and a compound monomer), the recycled polyester material has a relatively low viscosity after being depolymerized, and is improved in flow properties. Accordingly, the chemical reproduction operation may use a sieve having a relatively small mesh size to remove the impurities having a relatively small particle size from the polyester material.

In order to improve filtration, in the present embodiment, the second sieve preferably has a mesh size of 10 μm to 30 μm. That is, the second sieve is capable of filtering out solid impurities having a particle size larger than the above mesh size. However, the disclosure is not limited thereto.

In terms of filtering solid impurities, the physical reproduction operation may only filter out the solid impurities having a relatively large particle size in the recycled polyester material, while the chemical reproduction operation may filter out the solid impurities having a relatively small particle size in the recycled polyester material. Accordingly, production quality of the black polyester film may be effectively improved.

Specifically, the chemically regenerated polyester chips produced by the chemical reproduction step usually have a relatively low intrinsic viscosity. Moreover, the intrinsic viscosity of the chemically regenerated polyester chips is relatively easily controlled, and the intrinsic viscosity of the chemically regenerated polyester chips may be controlled to be lower than the intrinsic viscosity of the physically regenerated polyester chips.

Step S140 includes: mixing black regenerated polyester chips, the physically regenerated polyester chips, and the chemically regenerated polyester chips to form a polyester chip raw material according to a predetermined intrinsic viscosity.

The intrinsic viscosity of the polyester chip raw material is suitable for film making processes. Specifically, the intrinsic viscosity of the polyester chip raw material is 0.50 dL/g to 0.8 dL/g, and is preferably 0.50 dL/g to 0.60 dL/g. The predetermined intrinsic viscosity is 0.40 dL/g to 0.8 dL/g, and is preferably 0.50 dL/g to 0.65 dL/g.

More specifically, the black regenerated polyester chips, the physically regenerated polyester chips and the chemically regenerated polyester chips are mixed in a predetermined weight ratio according to the predetermined intrinsic viscosity. Accordingly, the black regenerated polyester chips, the physically regenerated polyester chips and the chemically regenerated polyester chips that are mixed have the predetermined intrinsic viscosity, and therefore are thus suitable for manufacturing the black polyester film.

The black regenerated polyester chips comprise a black additive. The black additive is selected from a group of consisting of graphite powder, nano-carbon black (NCB), carbon nanotube, and graphene.

The black regenerated polyester chips may be produced by the physical reproduction step or the chemical reproduction step. In other words, the black regenerated polyester chips comprise at least one of the physically black regenerated polyester chips and the chemically black regenerated polyester chips. The intrinsic viscosity of the black regenerated polyester chips is 0.25 dL/g to 0.70 dL/g, and is preferably 0.3 dL/g to 0.65 dL/g. In a preferable embodiment, only the physically black regenerated polyester chips is used.

Specifically, the manufacturing step of the physically black regenerated polyester chips includes: melting one part of the recycled polyester material to form a first molten mixture, adding the black additive into the first molten mixture to form a second molten mixture, and reshaping the second molten mixture to form the physically black regenerated polyester chips. Based on a total amount of 100 wt % of the physically black regenerated polyester chips, the physically black regenerated polyester chips include the black additive in 5 wt % to 25 wt %.

Specifically, the manufacturing step of the chemically black regenerated polyester chips includes: depolymerizing another part of the recycled polyester material to form a first oligomer mixture, adding the black additive into the first oligomer mixture to form a second oligomer mixture, and repolymerizing the second oligomer mixture to form the chemically black regenerated polyester chips. Based on a total amount of 100 wt % of the chemically black regenerated polyester chips, the chemically black regenerated polyester chips include the black additive in 5 wt % to 25 wt %.

In order to increase the proportion of the recycled polyester material used, each of the above various kinds of regenerated polyester chips is used in an appropriate amount.

In terms of the predetermined weight ratio, based on 100 parts by weight of the polyester chip raw material (i.e., all the polyester chips), the amount of the physically regenerated polyester chips used is preferably 50 parts by weight to 95 parts by weight, and particularly preferably 75 parts by weight to 95 parts by weight. The amount of the chemically regenerated polyester chips used is preferably 5 parts by weight to 50 parts by weight, and particularly preferably 5 parts by weight to 25 parts by weight. However, the disclosure is not limited thereto.

In a preferable embodiment, the amount of the physically regenerated polyester chips used is higher than the amount of the chemically regenerated polyester chips used. However, the disclosure is not limited thereto.

Step S150 includes: melting and then extruding the polyester chip raw material, thereby forming a black polyester film. The black polyester film has the predetermined intrinsic viscosity.

In the black polyester film, the physically regenerated polyester chips (including the physically black regenerated polyester chips) are formed into a physically regenerated polyester resin, the chemically regenerated polyester chips (including the chemically black regenerated polyester chips) are formed into a chemically regenerated polyester resin, and the black additive in the black regenerated polyester chips are uniformly dispersed in the physically regenerated polyester resin and the chemically regenerated polyester resin.

According to a mixing ratio in step S140, based on a total amount of 100 wt % of the black polyester film, the content of the physically regenerated polyester resin is preferably 50 wt % to 95 wt %, and particularly preferably 60 wt % to 80 wt %. The content of the chemically regenerated polyester resin is preferably 5 wt % to 50 wt %, and particularly preferably 20 wt % to 40 wt %. The content of the black additive is 0.1 wt % to 6 wt %, and is preferably 3 wt % to 6 wt %.

In addition, a total content of the physically regenerated polyester resin and the chemically regenerated polyester resin is 55 wt % to 100 wt %, and particularly preferably 70 wt % to 100 wt %.

According to the above configuration, the method for manufacturing a black polyester film of the present embodiment may use the recycled polyester material in a high proportion, and requires no or only a small number of additional virgin polyester resin. For example, in an embodiment of the disclosure, the amount of the virgin polyester resin used is usually not more than 50 parts by weight, preferably not more than 30 parts by weight, and particularly preferably not more than 10 parts by weight.

In an embodiment of the disclosure, the physically regenerated polyester chips have a first acid value, the chemically regenerated polyester chips have a second acid value, and the second acid value is greater than the first acid value. The first acid value is 10 mgKOH/g to 40 mgKOH/g, and the second acid value is 20 mgKOH/g and 70 mgKOH/g.

Figure 2:
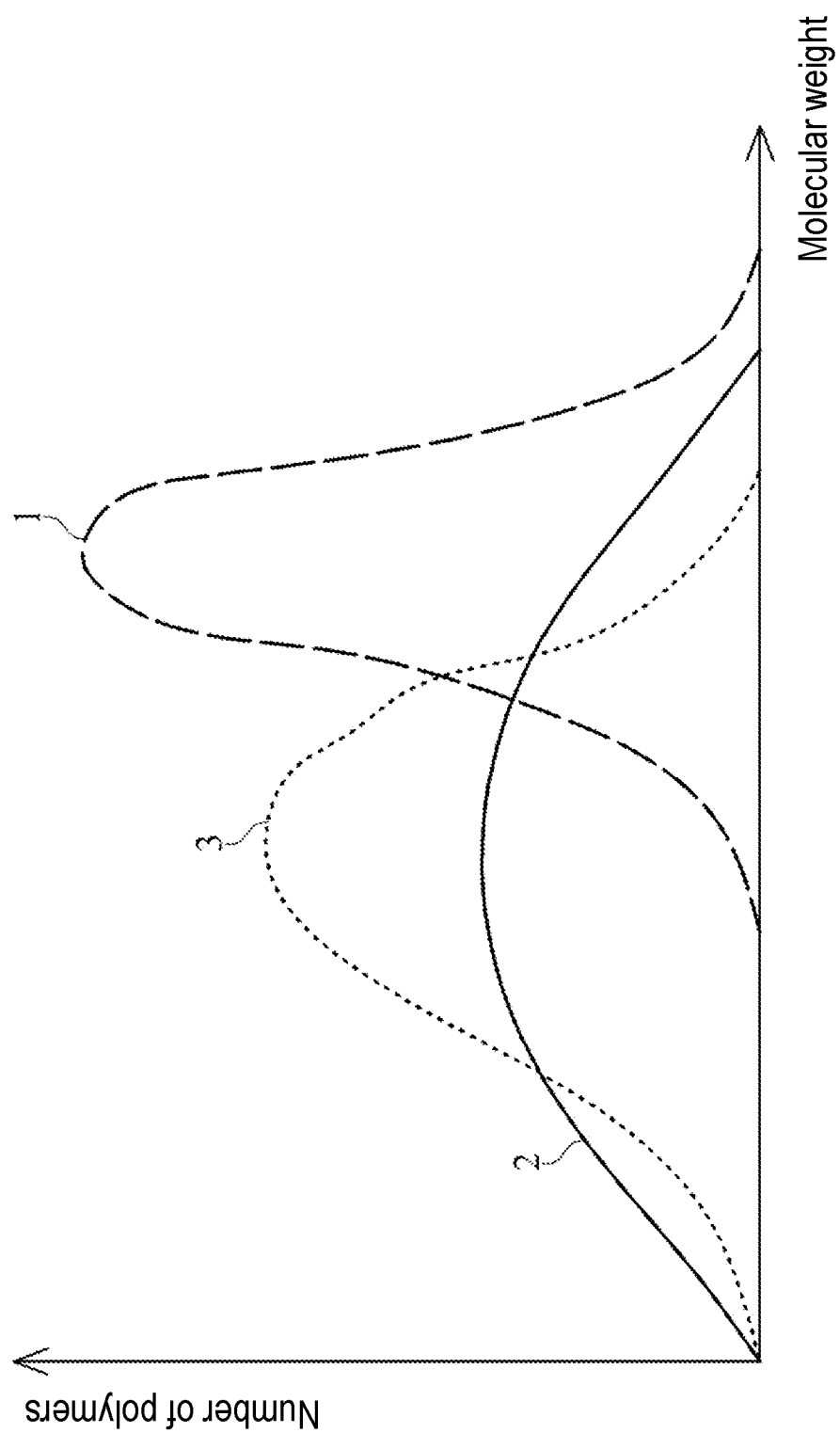
FIG. 2 is a schematic diagram of molecular weight distributions of a polyester chip raw material according to an embodiment of the disclosure.

Specifically, referring to FIG. 2, the physically regenerated polyester chips have a first molecular weight distribution 1, the chemically regenerated polyester chips have a second molecular weight distribution 2, and the second molecular weight distribution 2 has a wider range than the first molecular weight distribution 1.

Furthermore, by a combination of the physically regenerated polyester chips and the chemically regenerated polyester chips, the polyester chip raw material (the black regenerated polyester chips, the physically regenerated polyester chips, and the chemically regenerated polyester chips) has a third molecular weight distribution 3, and the third molecular weight distribution 3 has a range between the ranges of the first molecular weight distribution 1 and the second molecular weight distribution 2.

Specifically, in terms of molecular weight distribution, the chemically regenerated polyester chips have a relatively wide molecular weight distribution, and may improve productivity of the film making process. However, a black polyester film produced by only using the chemically regenerated polyester chips may have relatively poor physical properties (for example, mechanical properties). Furthermore, the production cost of the chemically regenerated polyester chips is relatively high.

The physically regenerated polyester chips have a relatively narrow molecular weight distribution, and may reduce productivity of the film making process. However, a black polyester film produced by only using the physically regenerated polyester chips may have relatively good physical properties. That is, neither a pure physical recycling method nor a pure chemical recycling method is satisfactory.

The method for manufacturing a black polyester film of an embodiment of the disclosure is characterized in that, by using both the physically regenerated polyester chips and the chemically regenerated polyester chips, the productivity of the film making process is improved, the black polyester film has relatively good physical properties, and the production cost of the black polyester film is reduced.

In addition, the method for manufacturing a black polyester film further includes adding inorganic particles to the recycled polyester material in the physical reproduction or in the chemical reproduction, so that the final formed black polyester film contains the inorganic particles.

In the present embodiment, the inorganic particles are a slipping agent. However, the disclosure is not limited thereto. The slipping agent is at least one material selected from the group consisting of silicon dioxide particles, calcium carbonate particles, barium sulfate particles, polystyrene particles, silicone particles, and acrylic particles. Furthermore, based on the total amount of 100 wt % of the black polyester film, a content of the slipping agent is 0.01 wt % to 10 wt %.

[Black Polyester Film]

The method for manufacturing a black polyester film of an embodiment of the disclosure has been described as above. The black polyester film of an embodiment of the disclosure will be described below. In the present embodiment, the black polyester film is formed by the above manufacturing method. However, the disclosure is not limited thereto.

A material of the black polyester film includes a physically regenerated polyester resin, a chemically regenerated polyester resin, and a black additive. The physically regenerated polyester resin is formed of physically regenerated polyester chips, and the physically regenerated polyester chips have a first intrinsic viscosity. The chemically regenerated polyester resin is formed of chemically regenerated polyester chips, and the chemically regenerated polyester chips have a second intrinsic viscosity. The second intrinsic viscosity is lower than the first intrinsic viscosity. The black additive is dispersed between the chemically regenerated polyester resin and the physically regenerated polyester resin.

It is worth mentioning that, the physically regenerated polyester chips and the chemically regenerated polyester chips are mixed according to a predetermined intrinsic viscosity, so that the produced black polyester film has the predetermined intrinsic viscosity.

In an embodiment of the disclosure, the first intrinsic viscosity of the physically regenerated polyester chips is not less than 0.60 dL/g, the second intrinsic viscosity of the chemically regenerated polyester chips is not more than 0.65 dL/g, and the predetermined intrinsic viscosity is 0.45 dL/g to 0.75 dL/g.

In a preferable embodiment of the disclosure, the first intrinsic viscosity of the physically regenerated polyester chips is 0.65 dL/g to 0.80 dL/g, the second intrinsic viscosity of the chemically regenerated polyester chips is 0.50 dL/g to 0.65 dL/g, and the predetermined intrinsic viscosity is 0.50 dL/g to 0.65 dL/g.

In addition, the black polyester film of the disclosure has an acid value of 10 mgKOH/g to 80 mgKOH/g, preferably of 15 mgKOH/g to 75 mgKOH/g, and particularly preferably of 20 mgKOH/g to 70 mgKOH/g. The acid value of the black polyester film is measured based on ASTM D7409-15. When the black polyester film has the acid value of 10 mgKOH/g to 80 mgKOH/g, the black polyester film exhibits heat resistance and hydrolysis resistance under the low acid value.

The black polyester film of the disclosure has a surface roughness (Ra) of 1 nm to 300 nm, preferably of 10 nm to 280 nm, and particularly preferably of 15 nm to 260 nm. The surface roughness is measured based on DIN EN ISO 4287/4288.

The black polyester film of the disclosure has a kinetic friction coefficient of 0.2 to 0.4. The kinetic friction coefficient is measured based on ASTMD1894.

When the black polyester film has the surface roughness of 1 nm to 300 nm and the kinetic friction coefficient of 0.2 to 0.4, it is more conductive for the film making, film collection, and back-end processing procedures of the black polyester film.

Figure 3:
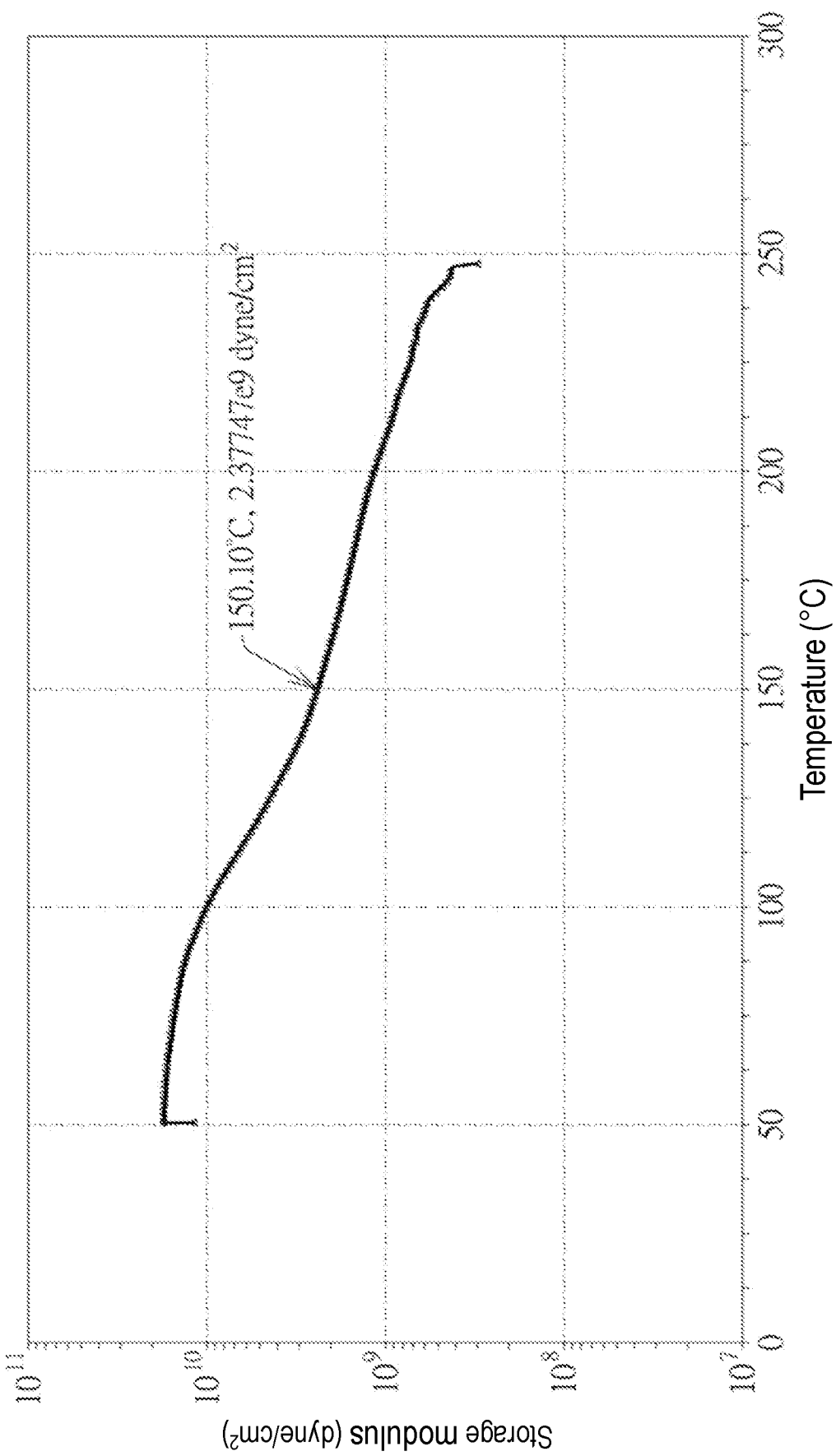
FIG. 3 shows test results of storage modulus of a black polyester film according to an embodiment of the disclosure.
Figure 4:
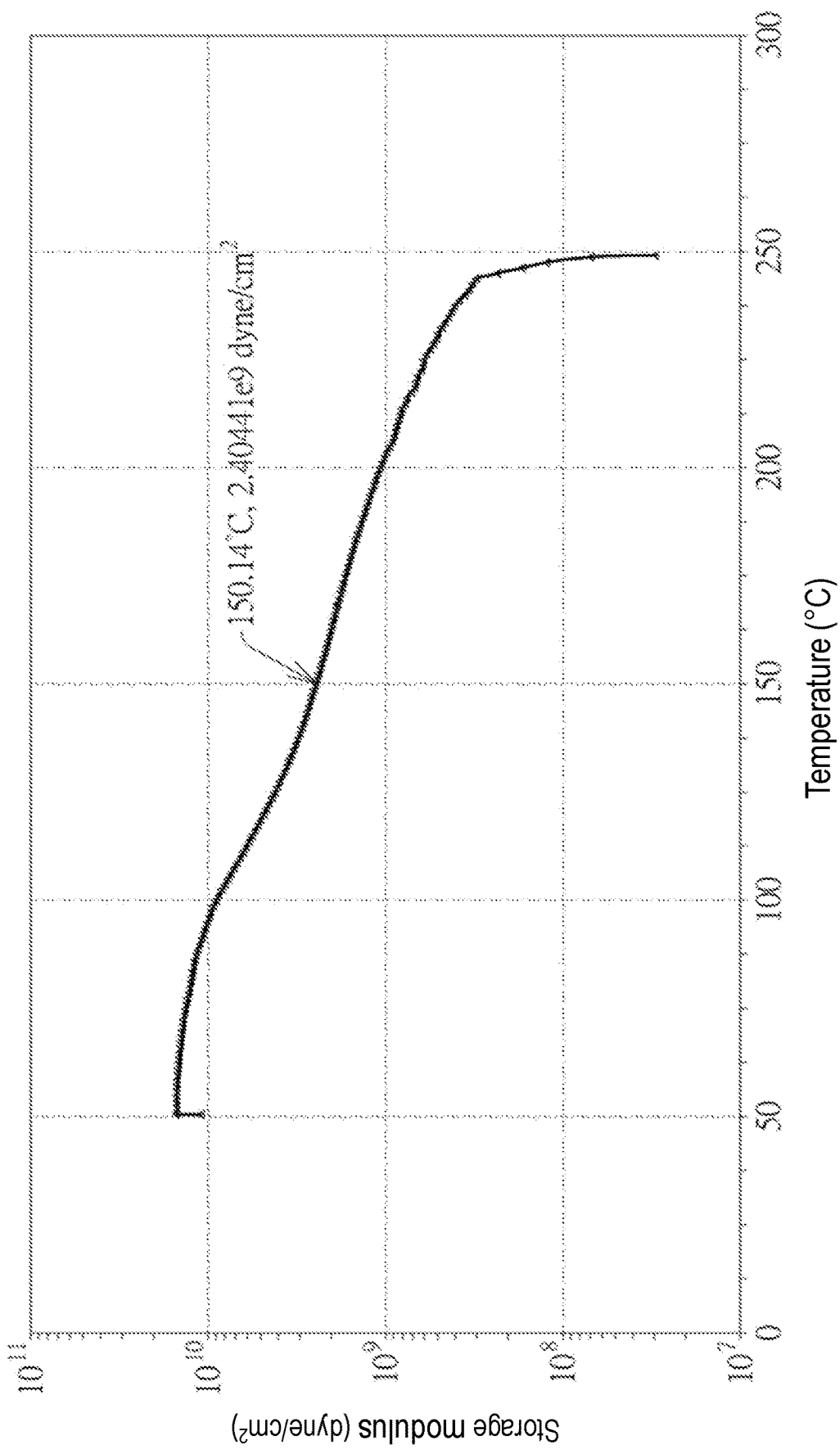
FIG. 4 shows test results of storage modulus of a black polyester film according to another embodiment of the disclosure.

The black polyester film of the disclosure has a storage modulus at 150° C. and 10 Hz of $1.5 \times 10^9$ dyne/cm$^2$ to $4.0 \times 10^9$ dyne/cm$^2$, preferably of $1.8 \times 10^9$ dyne/cm$^2$ to $3.5 \times$ $10^9$ dyne/cm², and particularly preferably of $2.0×10^9$ dyne/cm² to $3.0×10^9$ dyne/cm². The storage modulus of the black polyester film is an average value of the storage modulus of the black polyester film measured in the machine direction and the transverse direction by a dynamic viscoelasticity measurement device. Specific measurement results are shown in FIG. 3 and FIG. 4.

Furthermore, it is worth mentioning that, the above multiple physically regenerated polyester chips and multiple chemically regenerated polyester chips are both obtained by granulating the recycled polyester material through recycling and reusing. The recycled polyester material is recycled PET bottle flakes.

In an embodiment of the disclosure, a black polyester film has the following characteristics. Based on a total amount of 100 mol % of the black polyester film, a content of isophthalic acid in the black polyester film is 0.1 mol % to 7 mol %. Based on a total amount of 100 wt % of the black polyester film, a content of biomass-derived ethylene glycol in the black polyester film is not more than 5 wt %. An optical density of the black polyester film is more than or equal to 1.2. A surface roughness (Ra) of the black polyester film is 1 nm to 300 nm. A haze of the black polyester film is more than 80%. A kinetic friction coefficient of the black polyester film is 0.2 to 0.4.

In the black polyester film and the method for manufacturing the same provided by the disclosure, by the technical solution of "mixing black regenerated polyester chips, the physically regenerated polyester chips and the chemically regenerated polyester chips to form a polyester chip raw material according to a predetermined intrinsic viscosity", the predetermined intrinsic viscosity of the polyester chip raw material may be controlled to be suitable for the film extrusion process, and have a higher proportion of the recycled polyester raw materials.

The above description is only about the preferred and feasible embodiments of the disclosure and does not therefore limit the scope of the disclosure. All equivalent technical changes made from the specification and drawings of the disclosure shall fall within the scope of the disclosure.

What is claimed is:

1. A method for manufacturing a black polyester film, comprising:
    providing a recycled polyester material;
    physically regenerating a part of the recycled polyester material to form physically regenerated polyester chips, wherein the physically regenerated polyester chips have a first intrinsic viscosity ranging from 0.65 dL/g to 0.90 dL/g;
    chemically regenerating another part of the recycled polyester material to form chemically regenerated polyester chips, wherein the chemically regenerated polyester chips have a second intrinsic viscosity ranging from 0.40 dL/g to 0.65 dL/g, and the second intrinsic viscosity is lower than the first intrinsic viscosity;
    mixing a black additive, the physically regenerated polyester chips, and the chemically regenerated polyester chips to form a polyester chip raw material according to a predetermined intrinsic viscosity; and
    melting and then extruding the polyester chip raw material, thereby forming the black polyester film that the black polyester film has the predetermined intrinsic viscosity,
    wherein the black polyester film has an intrinsic viscosity of 0.4 dL/g to 0.8 dL/g, an acid value of 10 mgKOH/g to 80 mgKOH/g, a surface roughness of 1 nm to 300 nm, and a kinetic friction coefficient of 0.2 to 0.4,
    wherein based on 100 parts by weight of the polyester chip raw material, the content of the black additive is 0.1 wt % to 6 wt %, and the black additive is selected from a group of consisting of graphite powder, nano-carbon black (NCB), carbon nanotube, and graphene,
    wherein the polyester chip raw material comprises a slipping agent, based on 100 parts by weight of the polyester chip raw material, the content of the slipping agent is 0.01 wt % to 10 wt %, and the slipping agent is selected from the group consisting of silicon dioxide particles, calcium carbonate particles, barium sulfate particles, polystyrene particles, silicone particles, and acrylic particles.

2. A black polyester film, formed by mixing, melting and extruding a physically regenerated polyester resin and a chemically regenerated polyester resin to form a polyester chip raw material according to a predetermined intrinsic viscosity, the black polyester film having the predetermined intrinsic viscosity, wherein the physically regenerated polyester resin has a first intrinsic viscosity ranging from 0.65 dL/g to 0.90 dL/g, the chemically regenerated polyester resin has a second intrinsic viscosity ranging from 0.40 dL/g to 0.65 dL/g, and the second intrinsic viscosity is lower than the first intrinsic viscosity,
    wherein the polyester chip raw material comprises a black additive, based on 100 parts by weight of the polyester chip raw material, the content of the black additive is 0.1 wt % to 6 wt %, and the black additive is selected from a group of consisting of graphite powder, nano-carbon black (NCB), carbon nanotube, and graphene,
    wherein the polyester chip raw material comprises a slipping agent, based on 100 parts by weight of the polyester chip raw material, the content of the slipping agent is 0.01 wt % to 10 wt %, and the slipping agent is selected from the group consisting of silicon dioxide particles, calcium carbonate particles, barium sulfate particles, polystyrene particles, silicone particles, and acrylic particles,
    wherein the black polyester film has the predetermined intrinsic viscosity of 0.40 dL/g to 0.80 dL/g, an acid value of 10 mgKOH/g to 80 mgKOH/g, a surface roughness of 1 nm to 300 nm, and a kinetic friction coefficient of 0.2 to 0.4.

3. The black polyester film according to claim 2, wherein a content of isophthalic acid in the black polyester film is 0.1 mol % to 7 mol % based on a total amount of 100 mol % of the black polyester film, and a storage modulus of the black polyester film at 150° C. and 10 Hz is $1.5×10^9$ dyne/cm² to $4.0×10^9$ dyne/cm².

4. The black polyester film according to claim 2, wherein the black polyester film has a haze of more than 80%, a light transmittance of less than 10%, and an optical density more than or equal to 1.2.

5. The black polyester film according to claim 2, wherein a content of biomass-derived ethylene glycol in the black polyester film is not more than 5 wt % based on a total amount of 100 wt % of the black polyester film.

6. A black polyester film, having a predetermined intrinsic viscosity of 0.40 dL/g to 0.80 dL/g, an acid value of 10 mgKOH/g to 80 mgKOH/g, a surface roughness of 1 nm to 300 nm, and a kinetic friction coefficient of 0.2 to 0.4,
    wherein based on a total amount of 100 mol % of the black polyester film, a content of isophthalic acid in the black polyester film is 0.1 mol % to 7 mol %,
    wherein based on a total amount of 100 wt % of the black polyester film, a content of biomass-derived ethylene glycol in the black polyester film is not more than 5 wt %, or, based on all carbons in the black polyester film, a content of biomass-derived carbon measured by $C^{14}$ is not more than 5%.

7. The black polyester film according to claim 6, wherein a storage modulus of the black polyester film at 150° C. and 10 Hz is $1.5 \times 10^9$ dyne/cm$^2$ to $4.0 \times 10^9$ dyne/cm$^2$.

8. The black polyester film according to claim 6, wherein the black polyester film has a haze of more than 80%, a light transmittance of less than 10%, and an optical density of more than or equal to 1.2.

* * * * *